United States Patent [19]
Scholtes

[11] 3,889,559
[45] June 17, 1975

[54] RETRACTABLE SCOOP FOR CATCHING MACHINED PARTS

[76] Inventor: Lorin H. Scholtes, 804 N. Riverview, Bellevue, Iowa 52031

[22] Filed: June 10, 1974

[21] Appl. No.: 477,586

[52] U.S. Cl. .................................. 82/2.5; 82/34 R
[51] Int. Cl. ....................... B23b 13/00; B23b 3/36
[58] Field of Search ............................ 82/2.5, 34 R

[56] References Cited
UNITED STATES PATENTS

| | | | |
|---|---|---|---|
| 1,286,299 | 12/1918 | Hambleton | 82/2.5 X |
| 3,736,819 | 6/1973 | Gibbon | 82/2.5 |
| 3,815,453 | 6/1974 | Takano et al. | 82/2.5 |
| 3,823,628 | 7/1974 | Fortune | 82/2.5 |

*Primary Examiner*—Harrison L. Hinson
*Attorney, Agent, or Firm*—Glenn H. Antrim

[57] ABSTRACT

Positioning of a scoop is synchronized with operation of an automatic machine to catch parts while a minimum amount of chips are falling. The scoop is pivotally attached to the end of a chute that comprises telescoping troughs. A pneumatic actuator is attached to the troughs, and control means synchronized with the machine operates the actuator for extending the troughs. The scoop has an arm for engaging a stationary stop as the troughs are nearly retracted for throwing the part along the troughs to a tote tray.

5 Claims, 9 Drawing Figures

PATENTED JUN 17 1975

3,889,559

RETRACTABLE SCOOP FOR CATCHING MACHINED PARTS

BACKGROUND OF THE INVENTION

This invention relates to devices for conveying parts from automatic machines such as lathes and screw machines and particularly to devices having catching scoops synchronized with operation of the machines to be positioned for catching falling parts while few chips are being made.

Commonly, parts being made by automatic machines drop in their chip pans and are sorted manually. Sometimes, various automatic sorting and conveying means have been used for parts of suitable sizes and shapes. A blast of air has been used to separate relatively light scrap from desired parts, but expensive piping is required and the system is inefficient. Screens that may be used with shakers have been included in conveyers to drop relatively small pieces of scrap.

SUMMARY OF THE INVENTION

The present device for conveying parts from an automatic machine has a scoop positioned repeatedly beneath the forming and cutting tools only long enough to catch parts while relatively small amounts of chips are falling. The scoop is attached to the end of an extensible chute, and an actuator for extending the chute has its operation timed with the operation of the cutoff tool of the machine to which the catching device is attached.

In a preferred embodiment, the chute comprises two troughs, one arranged to slide longitudinal in the other. A pneumatic double-acting cylinder is connected between the troughs to extend the sliding trough in synchronism with operation of the machine. A scoop for catching parts is pivotally connected to an outer end of the sliding trough. A member projecting from the scoop and a stop positioned to be engaged when the sliding trough approaches a retracted position tilt the scoop upwardly quickly about its pivot on a horizontal axis to throw the parts one at a time along the chute to a tote box.

The present devices operate efficiently to separate parts from scrap and convey the parts from the machines. The use of the device decreases the amount of manual labor required to operate automatic machines.

DESCRIPTION OF THE PREFERRED EMBODIMENT

Figure 1:
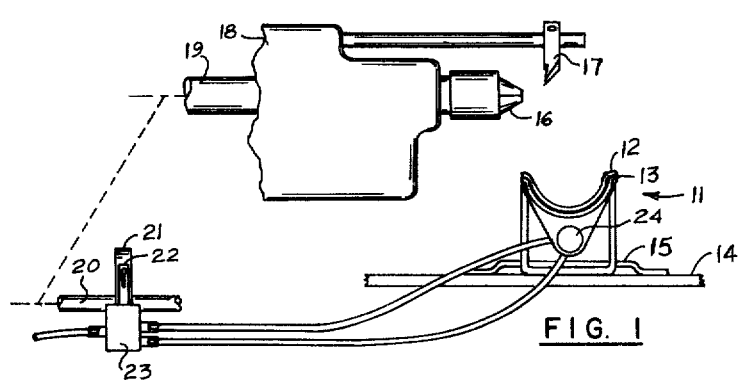
FIG. 1 is an end view of retractable scoop of this invention and a fragmentary plan view of a machine on which it is mounted.

In FIG. 1, a retractable chute has an inner sliding trough 12 and an outer stationary trough 13. The outer trough 13 is mounted to the bed 14 of an automatic machine, or to a shelf attached to the bed, by a mounting bracket 15. The location of the bracket 15 places the retractable chute in line with a point below a holding chuck 16 and a cutting tool 17 of a headstock 18 of the automatic machine. The machine has a headstock spindle 19 and a camshaft 20 coupled for synchronous rotation. Either a usual or an additional cam or wheel 21 on the camshaft 20 is provided with an operating bracket 22 for operating a pneumatic valve control 23. The control 23 operates the double-acting pneumatic cylinder 24 (FIG. 4) for determining the extension of the inner sliding trough 12.

Figure 2:
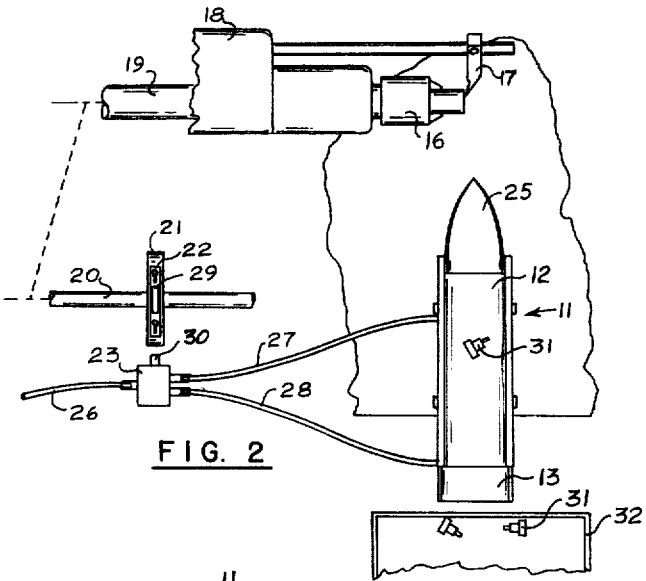
Figure 8:
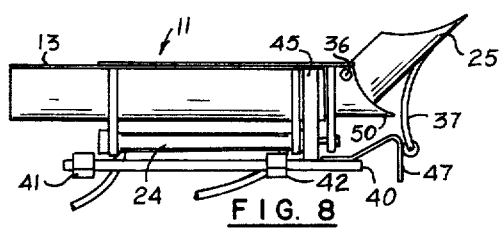
FIG. 8 is a side view of the retractable scoop to show tilting of the scoop.

With reference to the top view of FIG. 2 and the side view of the retractable chute 11 of FIG. 8, the chute is normally retracted while the operating bracket 22 is not bearing against an actuator of the pneumatic valve control 23. A scoop 25 is pivoted to the outer end of the inner sliding trough 12, and it is normally tilted such that its outer end is in an upward position as shown in FIG. 8. Since the scoop 25 is quite far from a vertical line through the spindle 16, chips made during the forming and the cutting-off operations do not fall in the scoop.

Figure 3:
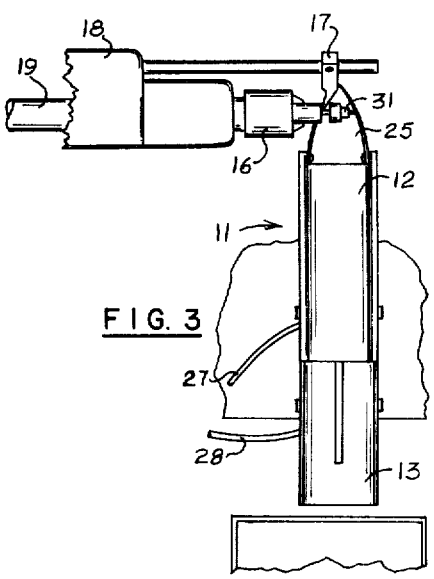
FIGS. 2 and 3 are top views of the retractable scoop shown retracted and extended respectively with respect to the cutting tool of the machine.

The pneumatic control 23 has a hose 26 connected to a supply of air, a hose 27 connected to a front nipple of the cylinder 24, and a hose 28 connected to a rear nipple of the cylinder 24 for providing two-way operation in a conventional manner. When the cutting tool 17 reaches the position where a part is nearly cut off, an actuating arm 29 of the operating bracket 22 engages an actuating plunger 30 of the pneumatic valve control 23 to extend the cylinder or actuator 24 and thereby to extend the inner trough 12 sufficiently to place the scoop 25 beneath the part being cut off as shown in FIG. 3. The actuating arm 29 continues to engage the actuating plunger 30 of the valve control 23 only about long enough to permit a part 31 to fall in the scoop 25. As the plunger 30 returns to its normal position and causes the inner trough 12 and the scoop 25 to approach their normal positions, the scoop 25 is tilted to throw a part 31 along the inner trough 12 out of the retractable chute 11 into the tote tray 32.

Figure 4:
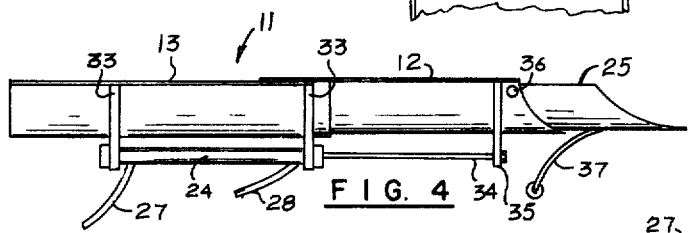
FIG. 4 is a side view of the retractable scoop with two telescoping troughs.

In FIG. 4, the cylinder 24 is shown mounted below the outer trough 13 by suitable straps or brackets 33. The outer end of the piston 34 is connected to the lower end of a bracket 35 that extends downwardly from the outer end of the inner sliding trough 12. The scoop has a substantially semi-circular cross section and a bluntly pointed, outer end portion. The upper opposite corners of the inner end are mounted to the upper outer end of the inner sliding trough 12 by a pair of pivots 36 at the outer edges of the trough, the pivots being laterally aligned. The point of the scoop 25 can be moved upwardly and backwardly toward the trough in an arc about its pivots 36. An actuating member or arm 37 has one end attached to the central lower portion of the scoop 25, and the arm extends downwardly and rearwardly for engaging a stop 47 that causes the scoop 25 to tilt.

Figure 5:
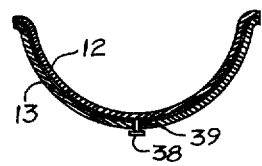
FIG. 5 is a cross-sectional view of the troughs.
Figure 6:
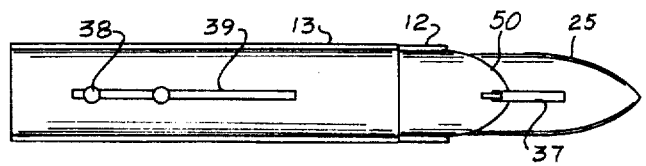
FIG. 6 is a bottom view of the retractable scoop.

In the cross-sectional view of FIG. 5, the inner trough 12 is shown a sliding fit within the outer arcuate trough 13. A key 38 retains the troughs together. The head of the key 38 is below the outer trough 13, and the shank of the key extends through a slot 39 and is secured to the bottom of the inner sliding trough 12. The slot 39 extends longitudinally along the bottom of the outer trough as shown in FIG. 6. The upper edges of the troughs 12 and 13 are curved or rolled outwardly for a short distance and bear against each other to prevent rotation of the inner trough.

Figure 7:
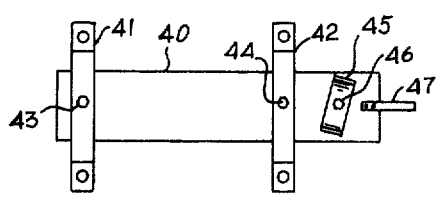
FIG. 7 is a top view of a typical adjustable mounting bracket for the retractable scoop.

Different mounting bases for mounting the retractable scoop on different automatic machines must be provided according to the structures of the machines. In FIG. 7, a mounting plate 40 is shown with spaced adjustable mounting straps 41 and 42. Each of the straps 41 and 42 has downwardly offset ends so that the plate 40 positioned below the central portions of the straps 41 and 42 on a mounting surface of the machine can be rotated to align the retractable chute 11 as required for placing the scoop 25 beneath a falling part while the chute is extended. The plate 40 can be pivoted about a bolt 43 that passes through the central portion of the strap 41 and the plate 40. When the chute 11 is aligned, a set screw 44 through the center of the strap 42 is tightened to force the plate 40 against the mounting surface of the machine to which the mounting base is attached. A mounting bracket 45 has opposite upstanding portions to be attached to the outer surface of the front end of the outer trough 13 and is secured to the front of the base 40 by a set screw or bolt 46 that can be tightened after the chute 11 is rotated to a desired position.

A stop 47 is mounted either on the machine or on the base 40 as shown in FIGS. 7 and 8 to be engaged by the arm 37 for tilting the scoop 25 as the chute 11 is nearly retracted. According to the present illustration, a strap 47 is fastened to the middle of the front end of the plate 40 to extend forward with a front end curved downwardly to function as the stopping surface to be engaged by the arm 37. To close the space at the bottom of the scoop 25 while it is tilted upwardly, either the rear end of the scoop 25 may be provided with a lip or, as shown, a lip 48 may extend below the scoop 25 at the front of the inner trough 12.

Figure 9:
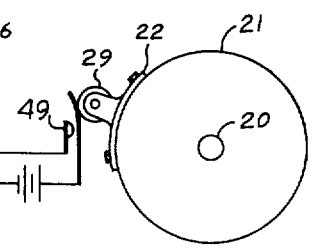
FIG. 9 is a diagram of a control to be used for synchronizing the extension and retraction of the telescoping troughs with the operation of the machine.

The double-acting cylinder 24 may be controlled by a conventional four-way pneumatic valve 23 as shown in FIG. 1 or by a solenoid-operated four-way valve 48 shown in FIG. 9. When the solenoid is used, a microswitch 49 is positioned properly to be engaged by the arm 29 of the operating bracket 22. Preferably the bracket 22 has slotted mounting holes to facilitate circumferential adjustment of the bracket on the cam 21.

Before operating, the chute 11 is mounted on a suitable mounting bracket as shown in FIG. 7 and aligned on a machine so that the scoop 25 is in position to catch falling parts one at a time while the chute 11 is extended. The bracket 22 is placed on a part synchronized with operation of the cutting tool 17 and is adjusted or timed so that the scoop 25 is extended just before each machined part is to fall. A relatively small number of metal chips will cling to the cutting and forming tools of the machine and drop into the scoop 25 while it is extended to catch parts. These chips will move along the inner trough 12 and fall off its rear edge into the outer trough 13. Subsequent movement of the inner trough will cause some chips to fall through the slot 39 and the remaining chips to be pushed before the rear edge of the inner trough 12 and off the rear edge of the outer trough 13. The tote tray 32 of FIG. 2 can be placed back of the place where most of these chips fall.

I claim:

1. A machine attachment for catching parts comprising:

an extensible chute adapted to be attached to an automatic machine with a cutoff tool, one end of said chute being a catching portion with an open top for catching falling parts, said chute normally being retracted outside the path to be taken by falling parts and chips, an extensible actuator connected between the opposite ends of said extensible chute, control means connected to said actuator and adapted to be mounted on said automatic machine, a control operator adapted to be connected to said automatic machine to move in synchronism with the operation of said cutoff tool and to engage said control means, said control means operating in response to engagement by said control operator to extend said extensible actuator and said chute for positioning said catching portion beneath said cutoff tool for an instant at the end of each of the cutoff operations of said machine for catching a part to be conveyed along said chute, and said control means reoperating at the end of each of said cutoff operations to retract said extensible chute.

2. A machine attachment for catching parts as claimed in claim 1 wherein said one end of said chute having a catching portion is a scoop fastened to the remainder of said chute by a pivot on a transverse axis permitting said chute to be rotated upwardly about the upper portion of the remainder of the chute to which it is attached, a projecting member for tilting said scoop about said pivot, said projecting member extending outwardly from a point below said pivot, a stop positioned in line with the path of travel of said projecting member to be engaged thereby as said extensible chute approaches its normal retracted position, and said scoop in response to engagement of its projecting member by said stop being rotated upwardly about said pivot to discharge any part therein to said remainder of said chute.

3. A machine attachment as claimed in claim 2 wherein said remainder of said chute comprises first and second troughs, said second trough being a longitudinal sliding fit within said first trough, said scoop being pivoted to the extensible end of said second trough.

4. A machine attachment as claimed in claim 3 wherein said extensible actuator is a double-acting fluid cylinder having its cylinder fixed with respect to said first trough and its piston connected to said extensible end of said second trough.

5. A machine attachment for catching parts as claimed in claim 4 wherein said first trough has a longitudinal slot along the bottom thereof as a keyway, and a key member extending downwardly from the bottom of said second trough through said keyway.

* * * * *